Inventors:
Mahmoud El Shishini,
and
Mohamed Abdu Hassan El Said,
By their attorneys:
Baldwin & Wight

Patented Oct. 25, 1949

2,486,068

UNITED STATES PATENT OFFICE 2,486,068

ELECTRICAL DEVICE FOR EFFECTING THE MULTIPLICATION OR DIVISION OF INDEPENDENT QUANTITIES

Mahmoud El Shishini and Mohamed Abdu Hassan El-Said, Giza, Cairo, Egypt

Application June 19, 1946, Serial No. 677,666 In Great Britain July 19, 1944

13 Claims. (Cl. 171—95)

This invention, which is the result of careful theoretical investigation and experimental verification into the behavior and operation of valve wattmeters and the like provides a new and useful form of electrical device in which use is made of the principle involved in the multiplication or division of independent quantities by logarithmic conversion and anti-logarithmic reconversion.

We believe that, we are the first to apply this principle to an electrical device for the effecting of multiplication or division of independent electrical quantities.

According to the invention, in its broadest aspect, an electrical device for effecting the multiplication or division of independent quantities by logarithmic conversion and anti-logarithmic reconversion includes electrical means for deriving from said quantities electrical quantities the instantaneous values of which are proportional to the logarithm of the values of said quantities, means for adding or subtracting said electrical quantities to obtain a sum or difference electrical quantity, and means for deriving from said sum or difference electrical quantity a final electrical quantity the instantaneous value of which is proportional to the anti-logarithm of said sum or difference electrical quantity and therefore is the product or quotient of the said independent quantities.

Also according to the invention, in a broad aspect, an electrical device for effecting the multiplication or division of independent quantities by logarithmic conversion and anti-logarithmic reconversion includes a circuit arrangement having a plurality of input circuits to each of which a component of electrical power, being a measure of an independent quantity, is applied and a like plurality of output circuits one associated with each input circuit in each of which output circuits appears a component of electrical power having an instantaneous logarithmic relationship to the component of power applied to the associated input circuit, and a further circuit arrangement having an input circuit to which said components of power having said logarithmic relationship are applied and an output circuit in which is produced a component of electrical power having an instantaneous exponential relationship to the sum or difference of said components having said logarithmic relationship.

The component of power applied to each of said plurality of input circuits may be the voltage component or the current component, or that applied to one or some of said plurality of input circuits may be the voltage component while that applied to another or other of said plurality may be the current component.

According to the invention in a more restricted aspect, a valve wattmeter includes a valve circuit arrangement having a first input circuit to which the voltage component of alternating power to be measured is applied to produce an output having an instantaneous logarithmic relationship to said voltage component, a second input circuit to which the current component of said power is applied to produce an output having an instantaneous logarithmic relationship to said current component, a load circuit to which said outputs are applied and in which they are added, a further valve circuit arrangement having an input circuit to which said added outputs are applied adapted to produce a final output having an instantaneous exponential relationship to said added outputs and a direct current indicator to which said final output is applied.

The first mentioned valve circuit arrangement consists of the two valves which may be pentodes operated as polarized diodes the voltages of the screen and the suppressor grids are adjusted such that the output is logarithmic against the input. This arrangement of pentodes is believed to be new and we wish to claim it.

The further valve circuit arrangement may include a valve polarized to operate on the exponential portion of its characteristic, or it may include a variable mu-valve.

The invention will be further described in connection with the accompanying drawings.

Figure 1:
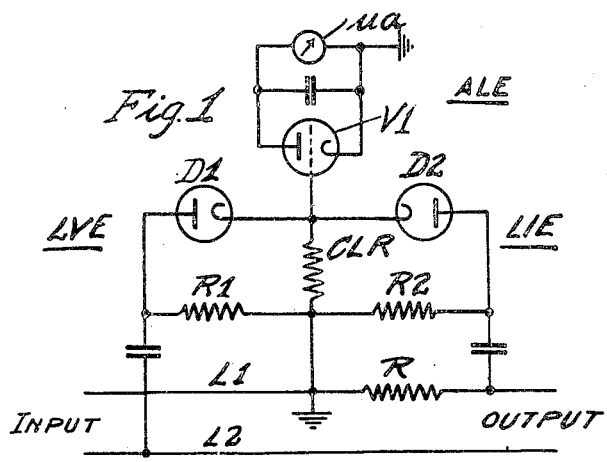
Fig. 1 illustrates the principle of operation of a valve wattmeter according to the invention.
Figure 2:
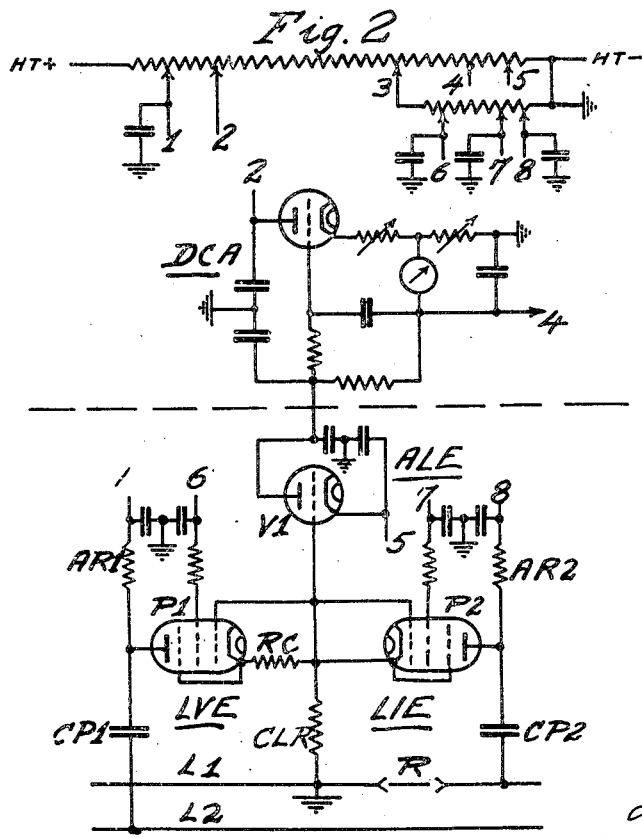
Fig. 2 illustrates a complete circuit diagram of a valve wattmeter according to the invention as set up for experimental purposes.
Figure 4:
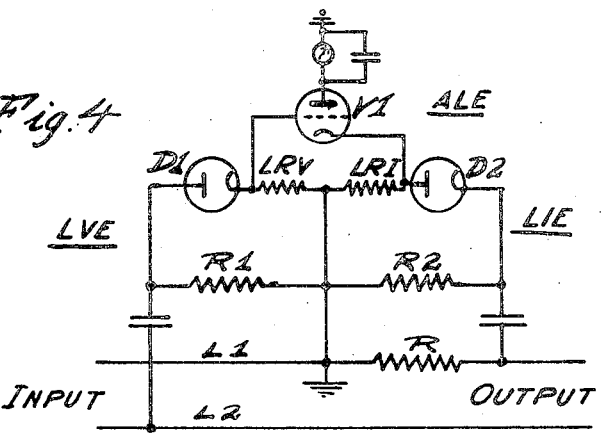
Figure 5:
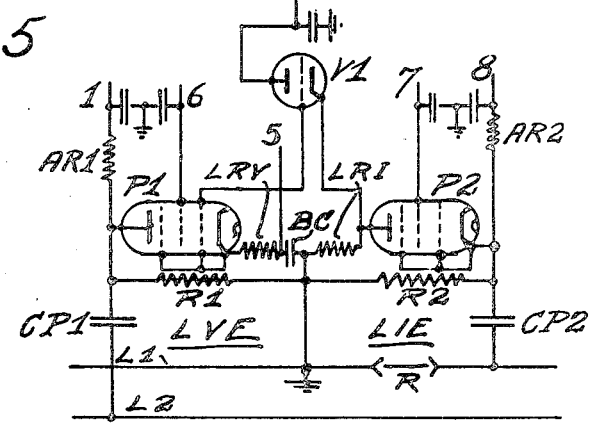

In Figs. 1 and 2, LVE and LIE are respectively the logarithmic voltage element and the logarithmic current element, and ALE is the anti-logarithmic or exponential element;

Fig. 4 shows a modified form of the circuit of Fig. 1;

Fig. 5 shows a modified form of the circuit of Fig. 2; and

Figures 3, 6:
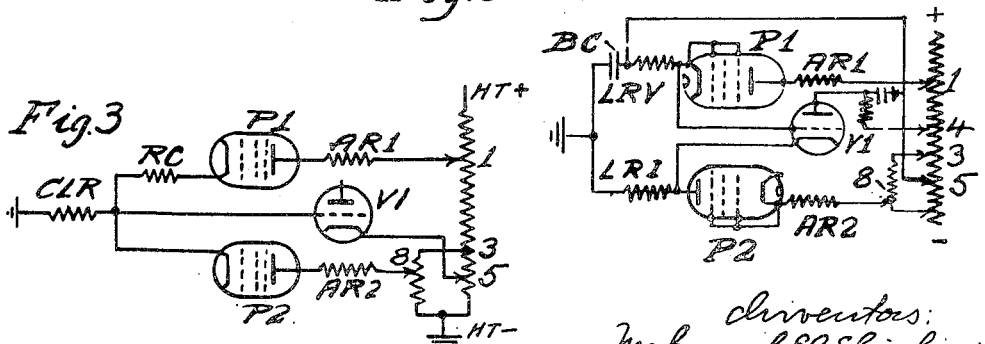
Fig. 3 is an explanatory detail of part of the circuit of Fig. 2.

Fig. 6 shows a modified form of the detail of the circuit illustrated in Fig. 3.

In Fig. 1, the two logarithmic elements include, respectively, diodes $D1$ and $D2$, connected across input resistors $R1$ and $R2$, and having a common linear load resistor CLR. Element LVE is connected across the leads L1 and L2 connecting a source of power to a power consuming load (neither of which is shown). Element LIE is connected across a resistor R inserted in one of the leads, L1, through which, of course, the whole of the current passes to the power-consuming load. The output currents from both logarithmic elements LVE and LIE circulate in a circuit which includes common load resistor CLR where the currents, which bear instantaneous logarithmic relationships to the potential across and current in leads L1 and L2, are added. Element ALE includes a variable $\mu$ valve V1 across the grid/cathode space of which the potential developed across resistor CLR is applied.

The anti-logarithmic element may be a valve in which the plate current—plotted to a logarithmic scale—against the grid voltage—plotted to a linear scale—is a straight line over an appreciable range. The slope of the straight line represents the index of the exponent or the base of the anti-logarithm. The function of the anti-logarithmic element here is to reconvert the added logarithms of the voltage and the current—as applied to its input terminals from elements LVE and LIE respectively—into anti-logarithms, thus causing its output to be proportional to the instantaneous product of the voltage across and the current through the tested circuit i. e. proportional to the instantaneous power. Mean values of the output can therefore be taken to indicate the mean power. A micro-ammeter $\mu a$ is included in the output circuit of valve V1.

In Fig. 2, in addition to the elements LVE, LIE and ALE, there is shown a direct current amplifier stage DCA. The two logarithmic elements include, respectively, pentodes P1 and P2, which replace diodes D1 and D2 of Fig. 1, and which are connected to operate as polarized diodes. The voltages of the screen-grid and suppressor-grid are adjusted such that the cathode current is proportional to the logarithm of the plate voltage. Eelment LVE is connected across the leads L1 and L2 connecting a source of power to a power consuming load (neither of which is shown). Element LIE is connected across a resistor R inserted in one of the leads L1. The output currents from the two logarithmic elements LVE and LIE circulate in a circuit which includes common load resistor CLR where the currents, which bear instantaneous logarithmic relationships to the potential across and current in leads L1 and L2, are added. The manner in which the output currents are added in load resistor CLR is indicated in Fig. 3. Element ALE includes a variable $\mu$ valve V1 across the grid/cathode space of which the potential developed across resistor CLR is applied, in a manner which can be readily seen in Fig. 3.

At the upper part of Fig. 2, a potential divider is illustrated and certain tapping points are indicated thereon. These points have been numbered and this indicates the points to which correspondingly numbered parts of the circuit are to be connected. Of course, the tapping points indicate merely approximate relative potentials and are not to be understood as having any quantitative value.

Methods of calibration of the logarithmic and anti-logarithmic elements have been evolved, and these have been verified experimentally. It may be said, that in pentode circuits the anode current—plotted to a linear scale—against the anode potential—plotted to a logarithmic scale—is a straight line over an appreciable range of anode voltage. The range of the straight line portion can be extended, and its slope can be controlled by the introduction of resistors into and the adjustment of resistors in the circuits and the adjustment of the potentials of the various electrodes of the valves.

Of course, the logarithms and exponents should be taken on the same base. This condition can be determined theoretically or experimentally, as can be shown.

Moreover, methods of calculating the resistive value of common load resistor CLR have been evolved. It is not thought necessary to set these out here, but it may be observed that the value should not be so high as to produce any serious coupling of the elements LVE and LIE.

In order to reduce, or to eliminate, any possibility of feed back, as a result of coupling by the common load resistor, between the voltage and current elements LVE and LIE, the circuits may be modified as illustrated in Figs. 4 to 6, which correspond respectively with Figs. 1 to 3. In this modification, the output currents from elements LVE and LIE, instead of being added in a common resistor CLR, are added in two separate resistors LRV and LRI one for each element and effectively connected in series so far as exponential element ALE is concerned. If, as is required in a valve wattmeter, the two currents are to be added, the two pentodes P1 and P2 are so connected that the anode of one is connected to the cathode of the other, thus to permit the currents to flow in the same direction in the load resistors. Then the grid/cathode space of valve V1 is connected across the series connected resistors LRV and LRI. A blocking condenser BC is included between resistor LRV and earth, and the cathode return is effected over a lead from the point of juncture of resistor LRV with capacitor BC to a convenient tapping point 5 on the potentiometer resistor as shown in Fig. 6. If the two output currents are to be subtracted, pentodes P1 and P2 of Fig. 5 are connected by resistors LRV and LRI, cathode to cathode.

It is thought that Figs. 4 to 6 need no further description, as they are otherwise so similar to Figs. 1 to 3.

It is apparent that either the logarithmic voltage element can be used without the logarithmic current element, or vice versa, for the measurement of the voltage across, or the current in, a circuit respectively. The introduction of a high resistance in the plate circuit of the anti-logarithmic element ALE—away from the diodes unit—changes its exponential characteristic to a fairly linear characteristic and hence can be considered with the terminating direct current amplifier as a two stage high gain direct current amplifier, which thus allows the rectified current through CLR to be sufficiently magnified and measured.

What we claim is:

1. A valve wattmeter including in combination a three valve-circuit arrangement, a first valve-circuit arrangement having an input circuit to which the voltage component of power to be measured is applied to produce an output which varies logarithmically against said voltage component, a second valve-circuit arrangement having an input circuit to which the current component of power to be measured is applied to produce an output which varies logarithmically against said current component, circuit means in which the outputs of the two valve-circuit arrangements are added, a third valve-circuit arrangement having an input circuit to which the added outputs are applied to produce a final output therefrom which varies exponentially against said added output, said three valve-circuit arrangement being so adjusted that the said final output is proportional to the instantaneous product of said voltage component into said current component of power to be measured, whereby said product is obtained by the superimposition of the added logarithms from first and second valve-circuits upon the anti-logarithm of said third valve-circuit.

2. A valve wattmeter including a first valve-circuit arrangement having an input circuit therefor, means connecting the input of said first valve-circuit arrangement across connections connecting a source of power to a power-consuming load, means within said first valve-circuit arrangement causing it to produce an output current which varies logarithmically against said voltage across said connections, a second valve-circuit arrangement therefor, means connecting the input of the second valve-circuit arrangement across a resistor connected in one of said connections connecting said source of power to said power-consuming load, means within said second valve-circuit arrangement causing it to produce an output current which varies logarithmically against current in said resistor, circuit means in which the outputs of the two valve-circuit arrangements are added, a third valve-circuit arrangement having an input circuit to which the added outputs are applied, means within said third valve-circuit arrangement causing it to produce a final output which varies exponentially against said input thereto, said circuit means in which the outputs of the two valve-circuits arrangements are added being so adjusted that said final output is proportional to the instantaneous product of said voltage component into said current component of power to be measured, whereby said product is obtained by the superimposition of the added logarithms from said first and second valve-circuits upon the anti-logarithm of said third valve-circuit.

3. A valve wattmeter as claimed in claim 2, wherein said first valve-circuit arrangement comprises a valve having a cathode, an anode, and at least two grids therein between, said valve being initially polarized and set to operate over a characteristic such that its cathode current varies logarithmically against its anode potential, said second valve-circuit arrangement comprising a valve having a cathode, an anode, and at least two grids therein between, said valve being initially polarized and set to operate over a characteristic such that its anode current varies logarithmically against its cathode potential, and said third valve-circuit arrangement comprising a valve initially polarized and set to operate over a characteristic such that its output current varies exponentially against its input voltage.

4. An electrical computing device for finding a combined product of primary electrical quantities including separate valve-means for each primary electrical quantity for deriving therefrom a secondary electrical quantity which varies logarithmically against the primary electrical quantity from which it is derived, resistor-means for obtaining the potential sum of said secondary electrical quantities, and tertiary valve-means for deriving from said resistor-means a tertiary electrical quantity which varies anti-logarithmically against said potential sum, and a final circuit means for extracting from said tertiary electrical quantity a final output proportional to the combined product of said primary electrical quantities, whereby said combined product is obtained by reconverting the sum of the logarithms from said separate valve-means into the anti-logarithm from said tertiary valve-means.

5. A valve wattmeter as claimed in claim 4, wherein means is provided for taking from said final output a direct current output proportional to the mean value of the power to be measured, and a means for measuring said direct current output.

6. A valve wattmeter including a circuit arrangement having a first input circuit to which the voltage component of power to be measured is applied to produce an output having an instantaneous logarithmic relationship to said voltage component, a second input circuit to which the current component of said power is applied to produce an output having an instantaneous logarithmic relationship to said current component, a load circuit to which said outputs are applied and in which they are added, a further circuit arrangement having an input circuit connected to said load circuit to which said added outputs are applied and adapted to produce a final output having an instantaneous exponential relationship to said added outputs, and a direct current indicator to which said last mentioned final output is applied.

7. A wattmeter as claimed in claim 6, wherein the further valve circuit arrangement includes a multiple electrode valve set to operate on the exponential portion of its anode current-grid voltage characteristic.

8. In an electrical computing device for finding a desired combination, a plurality of electrical quantities by logarithmic and anti-logarithmic computation, a plurality of pentodes, each including a cathode, a control grid, a screen grid, a suppressor grid, and an anode to each of which a different one of said electrical quantities is applied to produce electrical quantities having logarithmic relationships with said plurality of electrical quantities, including means for applying a bias potential to the control grid, means for applying a bias potential to the screen grid, and a means for applying a bias potential to the suppressor grid of each pentode, wherein said bias potentials are such that the operating characteristic of the pentode is logarithmic.

9. An electrical computing device for finding a desired combination of primary electrical quantities, including separate electrical means for each primary electrical quantity for deriving therefrom a secondary electrical quantity which varies logarithmically against the primary electrical quantity from which it is derived, resistor-means for combining all secondary electrical quantities to obtain one combined secondary electrical quantity, and tertiary electrical means for deriving from said one combined secondary electrical quantity a tertiary electrical quantity which varies anti-logarithmically against said one combined secondary electrical quantity, and a final means for extracting from said tertiary electrical quantity a final output proportional to the desired combination of said primary electrical quantities, whereby the said combination is obtained by the reconversion of the combined logarithms from said separate electrical means into the anti-logarithm from said tertiary electrical means.

10. An electrical computing device as claimed in claim 9, wherein said separate electrical means are separate valve-circuits each comprising a valve having at least a cathode and an anode, said valve being initially polarized and set to operate such that its output is logarithmic against its input, and wherein said tertiary means is a valve-circuit comprising a valve initially polarized and set to operate such that its output is exponential against its input.

11. An electrical computing device for finding a combined quotient of two primary electrical quantities including separate valve means for each primary electrical quantity for deriving therefrom a secondary electrical quantity which varies logarithmically against the primary electrical quantity from which it is derived, resistor-means for obtaining the potential difference between said secondary electrical quantities, and tertiary valve means for deriving from said resistor-means a tertiary electrical quantity which varies anti-logarithmically against said potential difference, and a final circuit means for extracting from said tertiary electrical quantity a final output proportional to the combined quotient of said primary electrical quantities, whereby said combined quotient is obtained by reconverting the difference of the logarithms from said separate valve means into the anti-logarithm from said tertiary valve means.

12. An electrical computing device as claimed in claim 9, wherein said separate electrical means are separate valve-circuits incorporating valves having at least a cathode, an anode, and at least two grids thereinbetween, each of said valves being arranged such that its primary electrical quantity is applied effectively between the anode and the cathode, and which valve is set to operate such that the cathode current varies logarithmically against said applied primary electrical quantity.

13. An electrical computing device, as claimed in claim 9, wherein said separate electrical means are separate valve-circuits incorporating valves having at least a cathode, an anode, and at least two grids thereinbetween, each of said valves being arranged such that its primary electrical quantity is applied effectively between the anode and the cathode, and which valve is set to operate such that the anode current varies logarithmically against said applied primary electrical quantity.

MAHMOUD EL SHISHINI.
MOHAMED ABDU HASSAN EL-SAID.

REFERENCES CITED

The following references are of record in the file of this patent:

UNITED STATES PATENTS

| Number | Name | Date |
|---|---|---|
| 1,869,209 | Mead Jr. | July 26, 1932 |
| 1,907,487 | Booth | May 9, 1933 |
| 2,284,747 | Koch | June 2, 1942 |
| 2,313,666 | Peterson | Mar. 9, 1943 |

OTHER REFERENCES

Publication, Malling, "Electronic Wattmeter," Electronics, November 1945. (Copy in Division 42.)